(12) United States Patent
Ohara

(10) Patent No.: US 11,357,040 B2
(45) Date of Patent: Jun. 7, 2022

(54) USER APPARATUS AND BASE STATION APPARATUS

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/763,657

(22) PCT Filed: Nov. 16, 2017

(86) PCT No.: PCT/JP2017/041380
§ 371 (c)(1),
(2) Date: May 13, 2020

(87) PCT Pub. No.: WO2019/097661
PCT Pub. Date: May 23, 2019

(65) Prior Publication Data
US 2020/0281017 A1 Sep. 3, 2020

(51) Int. Cl.
*H04W 74/00* (2009.01)
*H04W 72/04* (2009.01)
(Continued)

(52) U.S. Cl.
CPC ..... *H04W 74/006* (2013.01); *H04W 72/0446* (2013.01); *H04W 56/0015* (2013.01); *H04W 74/0833* (2013.01)

(58) Field of Classification Search
CPC ........... H04W 74/0833; H04W 72/044; H04W 72/0493; H04L 5/0005
See application file for complete search history.

(56) References Cited

U.S. PATENT DOCUMENTS

| 2014/0177607 A1* | 6/2014 | Li | H04W 52/42 370/336 |
| 2015/0071134 A1* | 3/2015 | Li | H04W 72/044 370/280 |

(Continued)

FOREIGN PATENT DOCUMENTS

JP 2013-070355 A 4/2013

OTHER PUBLICATIONS

Extended European Search Report in counterpart European Application No. 17932167.4 dated Jun. 10, 2021 (9 pages).
(Continued)

*Primary Examiner* — Raj Jain
(74) *Attorney, Agent, or Firm* — Osha Bergman Watanabe & Burton LLP

(57) ABSTRACT

A user apparatus communicates with a base station apparatus via a radio frame. The user apparatus includes a reception unit configured to receive information related to a RACH configuration table that indicates allocation of RACH resources in the time domain in the radio frame and information used for excluding unavailable RACH resources of the radio frame in the time domain, a control unit configured to identify available RACH resources based on the information related to the RACH configuration table and the information used for excluding unavailable RACH resources, and a transmission unit configured to transmit a preamble to the base station apparatus by using the identified available RACH resources.

7 Claims, 14 Drawing Sheets

(51) Int. Cl.
*H04W 56/00* (2009.01)
*H04W 74/08* (2009.01)

(56) References Cited

U.S. PATENT DOCUMENTS

| 2015/0373656 | A1* | 12/2015 | Kim | H04W 56/0085 |
| | | | | 370/350 |
| 2017/0048889 | A1* | 2/2017 | Kadous | H04W 74/0816 |
| 2017/0231011 | A1* | 8/2017 | Park | H04W 74/006 |
| 2020/0281017 | A1* | 9/2020 | Ohara | H04W 74/08 |

OTHER PUBLICATIONS

Samsung; "RA Preamble Transmission"; 3GPP TSG RAN WG1 #82bis, R1-155438; Malmo, Sweden; Oct. 5-9, 2015 (3 pages).
ZTE; "RACH overload solutions"; 3GPP TSG RAN WG2 #70bis, R2-103742; Stockholm, Sweden; Jun. 28-Jul. 2, 2010 (8 pages).
International Search Report issued in PCT/JP2017/041380 dated Jan. 30, 2018 (5 pages).
Written Opinion of the International Searching Authority issued in PCT/JP2017/041380 dated Jan. 30, 2018 (5 pages).
3GPP TS 36.213 V14.4.0; "3rd Generation Partnership Project; Technical Specification Group Radio Access Network Evolved Universal Terrestrial Radio Access (E-UTRA); Physical layer procedures (Release 14)" Sep. 2017 (462 pages).
3GPP TS 36.211 V14.4.0; "3rd Generation Partnership Project; Technical Specification Group Radio Access Network Evolved Universal Terrestrial Radio Access (E-UTRA); Physical channels and modulation (Release 14)"; Sep. 2017 (197 pages).
NTT Docomo, Inc.; "Discussion on remaining details on PRACH"; 3GPP TSG RAN WG1 Meeting 90bis, R1-1718183; Prague, CZ; Oct. 9-13, 2017 (8 pages).
Office Action issued in the counterpart Japanese Patent Application No. 2019-554139, dated Jul. 27, 2021 (5 pages).
Vivo; "Design of group-common PDCCH"; 3GPP TSG RAN WG1 NR Adhoc#3, R1-1715631; Nagoya, Japan; Sep. 18-21, 2017 (11 pages).
CMCC; "Discussion on RACH configuration"; 3GPP TSG RAN WG1 Meeting Ad-hoc#3, R1-1716046; Nagoya, Japan; Sep. 18-21, 2017 (9 pages).
Office Action in counterpart Japanese Patent Application No. 2019-554139 dated Nov. 16, 2021 (5 pages).
NTT Docomo, Inc.; "Discussion on remaining details on RACH procedure"; 3GPP TSG RAN WG1 Meeting NR#3, R1-1716074; Nagoya, Japan; Sep. 18-21, 2017 (7 pages).
NTT Docomo, Inc.; "Discussion on PRACH preamble format details for long/short sequence length for NR"; 3GPP TSG RAN WG1 NR Ad-Hoc#2, R1-1711065; Qingdao, P.R. China; Jun. 27-30, 2017 (6 pages).

* cited by examiner

FIG.5
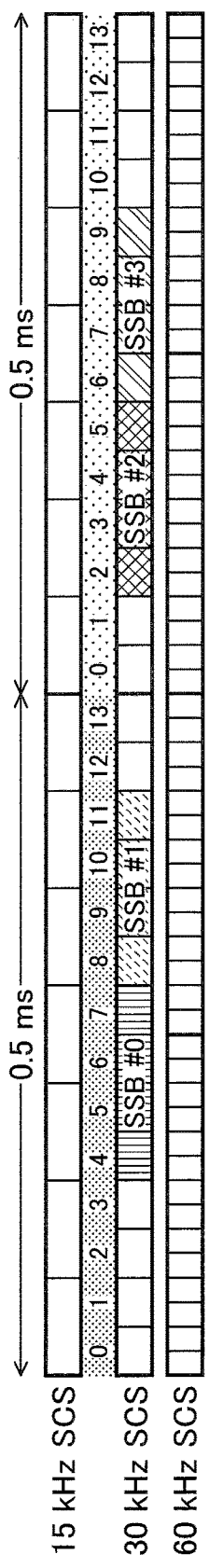
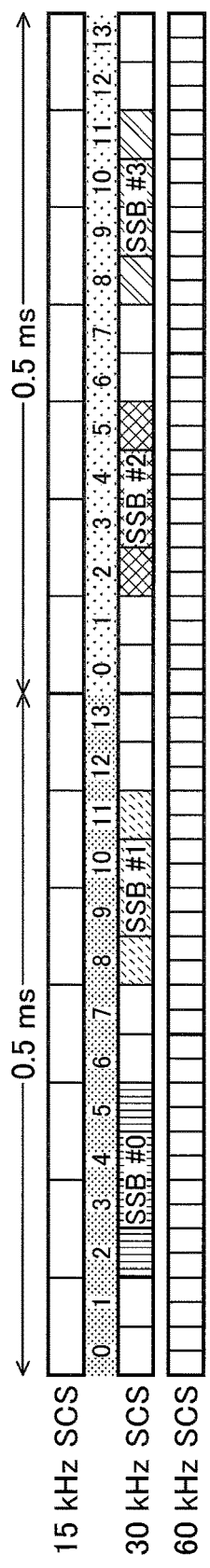
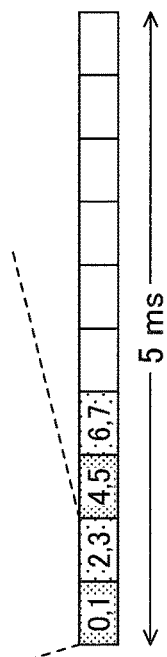
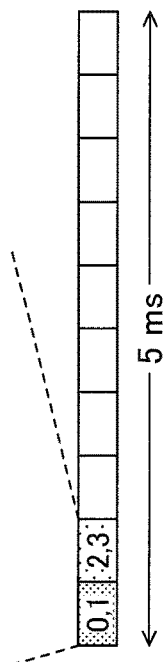

FIG.6
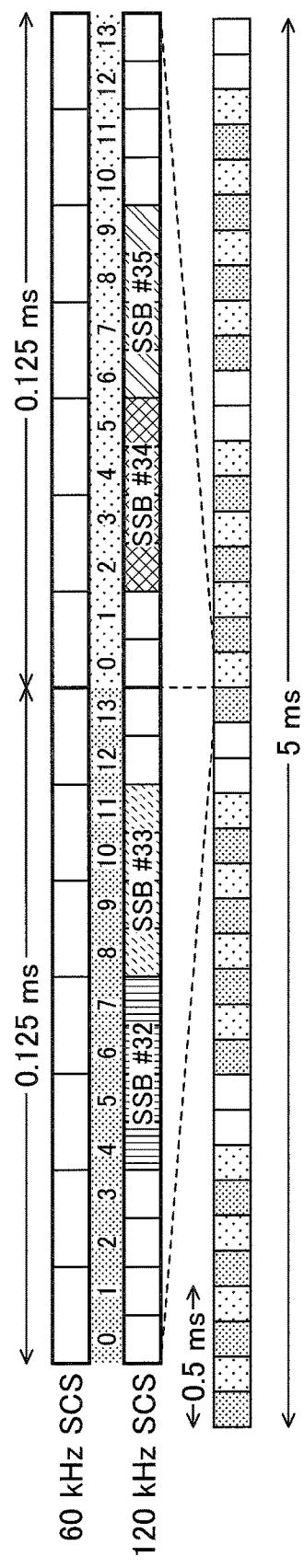
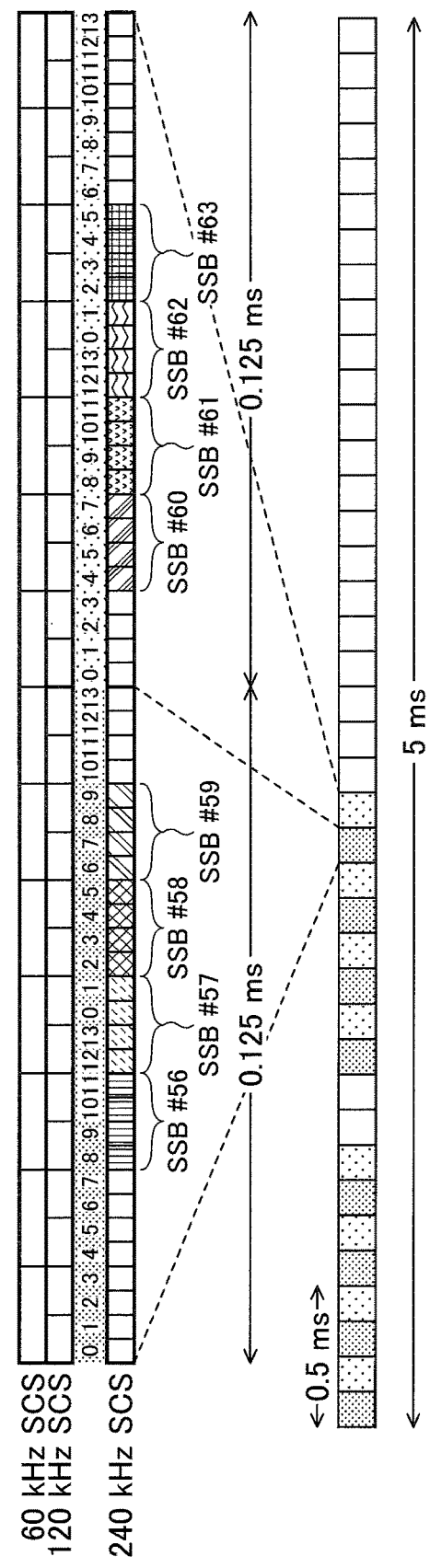

FIG.8

| Format | Downlink slot | | | Uplink slot | | |
| --- | --- | --- | --- | --- | --- | --- |
| | Downlink | Unknown | Not downlink | Not uplink | Unknown | Uplink |
| 0 | – | 0 – 13 | – | – | 0 – 13 | – |
| 1 | 0 – 13 | – | – | – | – | 0 – 13 |
| 2 | 0 – 13 | – | – | – | – | – |
| 3 | – | – | – | – | – | 0 – 13 |
| 4 | 0 | 1 – 12 | 13 | 0 | 1 – 12 | 13 |

USER APPARATUS AND BASE STATION APPARATUS

BACKGROUND OF THE INVENTION

1. Field of the Invention

The present invention relates to a user apparatus and a base station apparatus in a wireless communication system.

2. Description of the Related Art

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In NR, various wireless technologies have been discussed in order to meet requirements including latency equal to or less than 1 ms in a wireless section while realizing a throughput equal to or greater than 10 Gbps.

In NR, in initial access in which a user apparatus establishes a connection between the user apparatus and a base station apparatus, the user apparatus detects a cell according to a synchronization signal transmitted from the base station apparatus, identifies the cell, and obtains a part of system information necessary for the initial access (e.g., Non-Patent Document 1).

Further, in NR, it is expected that a wide range of frequencies, from a low frequency band similar to LTE (Long Term Evolution) to a frequency band that is higher than LTE, will be used. Propagation loss increases especially in a high frequency band. Therefore, in order to cover the propagation loss, an application of beamforming with a narrow beam width has been discussed (e.g., Non-Patent Document 2).

CITATION LIST

Non-Patent Document

[Non-Patent Document 1] 3GPP TS 36.213 V14.4.0 (2017-09)
[Non-Patent Document 2] 3GPP TS 36.211 V14.4.0 (2017-09)

SUMMARY OF THE INVENTION

Technical Problem

In NR, a synchronization signal and a part of system information, that are necessary for the initial access, are mapped to a radio frame by using a resource unit called "SS block" that consists of consecutive (successive) OFDM (Orthogonal Frequency Division Multiplexing) symbols. A user apparatus obtains information necessary for the initial access by receiving the SS block transmitted from a base station apparatus. The information necessary for the initial access includes information that specifies a RACH (Random Access Channel) resource and a preamble signal format.

Further, in NR, the base station apparatus transmits multiple beams by applying the beamforming. The user apparatus receives an SS block that is associated with the beam and obtains information necessary for the initial access. The RACH resources are associated with SS blocks. Further, in NR, with respect to symbols of slots included in a radio frame, it is possible to flexibly set as DL (Downlink) or UL (Uplink).

As a result, in the case of indicating, to the user apparatus, available RACH resources that correspond to NR SS block arrangement and DL/UL configuration, there is a problem in that the signaling overhead increases if the entire information for specifying the RACH resources needs to be indicated, the entire information being positions of the RACH resources in the time domain and the frequency domain, preamble indexes, associated SS blocks, etc.

The present invention has been made in view of the above. It is an object of the present invention to efficiently indicate available resources to the user apparatus in the initial access of a wireless communication system.

Solution to Problem

According to an embodiment of the present invention, a user apparatus that communicates with a base station apparatus via a radio frame is provided. The user apparatus includes a reception unit configured to receive information related to RACH configuration table that indicates allocation of RACH resources in the time domain in the radio frame and information that excludes RACH resources of the radio frame that are unavailable in the time domain, a control unit configured to identify available RACH resources based on the information related to the RACH configuration table and the information that excludes RACH resources that are unavailable, and a transmission unit configured to transmit a preamble to the base station apparatus by using the identified available RACH resources.

Advantageous Effects of Invention

According to an embodiment of the present invention, it is possible to efficiently indicate available resources to the user apparatus in the initial access of a wireless communication system.

BRIEF DESCRIPTION OF THE DRAWINGS

FIG. 5 is a drawing illustrating a configuration example (2) of an SS burst set according to an embodiment of the present invention.

FIG. 6 is a drawing illustrating a configuration example (3) of an SS burst set according to an embodiment of the present invention.

FIG. 8 is an example (1) of a slot format in an embodiment of the present invention.

DETAILED DESCRIPTION OF THE PREFERRED EMBODIMENTS

Figure 1:
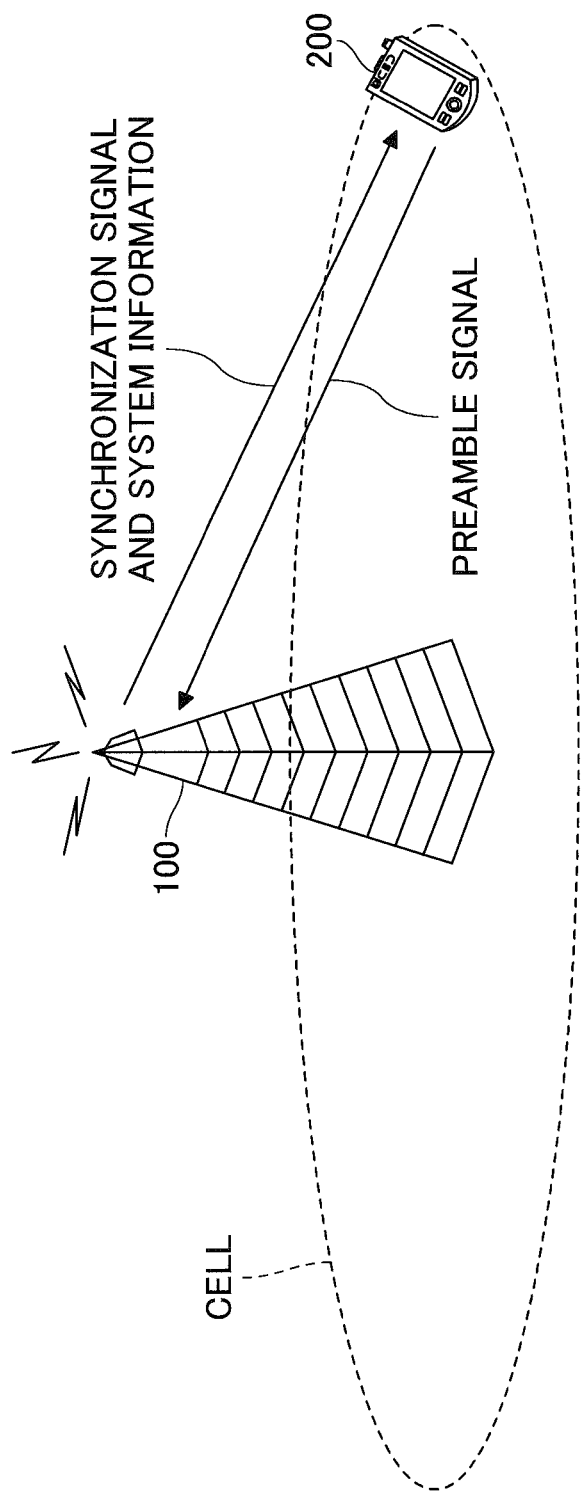
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to the above, may be referred to different terms. Further, the above-described terms used in NR will be referred to as "NR-SS", "NR-PSS", "NR-SSS", "NR-PBCH", "NR-PRACH", etc.

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, a single base station apparatus 100 and a single user apparatus 200 are illustrated as examples. There may be a plurality of the base station apparatuses 100 and a plurality of the user apparatuses 200.

The base station apparatus 100 is a communication apparatus that provides one or more cells and performs wireless communications with the user apparatus 200. As illustrated in FIG. 1, the base station apparatus 100 transmits a synchronization signal and system information to the user apparatus 200. The synchronization signal is, for example, an NR-PSS and an NR-SSS. The system information is transmitted via, for example, a NR-PBCH. Further, the system information may be referred to as broadcast information. The base station apparatus 100 and the user apparatus 200 are enabled to transmit and receive a signal by performing the beamforming. The user apparatus 200 is a communication apparatus, that has a wireless communication function, such as a smart-phone, a mobile phone, a tablet, a wearable terminal, an M2M (Machine-to-Machine) communication module, etc. The user apparatus 200 is wirelessly connected to the base station apparatus 100, and uses various communication services provided by the wireless communication system. As illustrated in FIG. 1, in an initial access stage, the user apparatus 200 transmits a random access preamble signal to the base station apparatus 100. The random access is performed based on RMSI (Remaining minimum system information) in addition to the system information received from the base station apparatus 100 via NR-PBCH. The RMSI is system information that is received via NR-PDSCH (Physical downlink shared channel) that is scheduled according to NR-PDCCH (Physical downlink control channel). The RMSI includes, for example, information necessary for the initial access, such as RACH setting.

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal by using a transmission beam" may be replaced by "transmitting a precoding-vector-multiplied signal (a signal precoded by a precoding vector)". Similarly, "receiving a signal by using a reception beam" may be replaced by "multiplying the received signal by a predetermined weight vector." Further, "transmitting a signal by using a transmission beam" may be expressed by "transmitting a signal via a specific antenna port". Similarly, "receiving a signal by using a reception beam" may be expressed by "receiving a signal via a specific antenna port." The antenna port refers to a logical antenna port or a physical antenna port defined in 3GPP standards. It should be noted that methods in which the transmission beam and the reception beam are formed are not limited to the methods described above. For example, a method may be used in which the base station apparatus 100 having plural antennas change each of the antenna angles and the user apparatus 200 having plural antennas change each of the antenna angles. A method in which the method of using precoding vectors and the method of changing antenna angles are combined may be used, or different antenna panels may be switched. The method of switching multiple antenna panels may be combined with other methods, or some other methods may be used. Further, for example, multiple transmission beams different from each other may be used in a high frequency band. An operation using multiple transmission beams is referred to as a "multi-beam operation", and an operation using a single transmission beam is referred to as a "single-beam operation".

Embodiment

In the following, one or more embodiments will be described.

Figure 2:
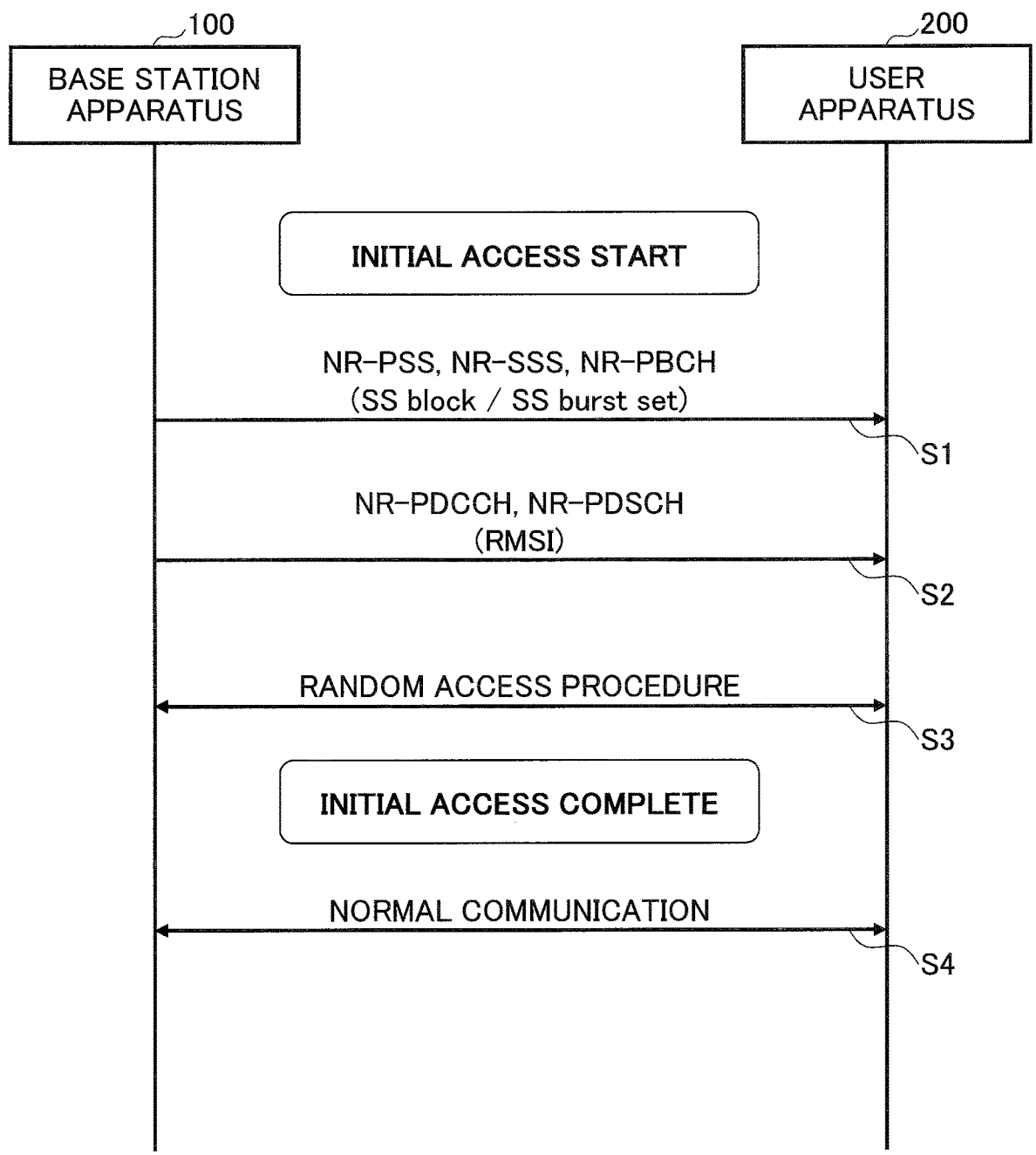
FIG. 2 is an example of an initial access sequence according to an embodiment of the present invention.

FIG. 2 is an example of an initial access sequence according to an embodiment of the present invention. When initial access is started, in step S1, the base station apparatus 100 transmits an NR-PSS, an NR-SSS, and an NR-PBCH (i.e., SS block) to the user apparatus 200. The NR-PBCH includes a part of system information. The base station apparatus 100 repeatedly transmits an SS burst set including multiple SS blocks to the user apparatus 200 at a cycle of SS burst set periodicity. In the case where multiple SS blocks are included in a SS burst set, the multiple SS blocks may be associated with corresponding different beams under the multi-beam operation environment.

With respect to the above, the user apparatus 200 receives the NR-PSS transmitted from the base station apparatus 100, and uses the NR-PSS for identifying at least a part of an initial time, a frequency synchronization, and a cell ID (identity). Further, the user apparatus 200 receives the NR-SSS transmitted from the base station apparatus 100, and uses the NR-SSS for identifying at least a part of the cell ID. Further, the user apparatus 200 obtains information used for obtaining a part of system information necessary for the initial access (e.g., a system frame number (SFN), other system information RMSI, etc.) by receiving the NR-PBCH transmitted from the base station apparatus 100.

Subsequently, in step S2, other system information including the RMSI is received via a NR-PDSCH scheduled according to the NR-PDCCH. The RMSI includes information that is used for identifying a resource for performing a random access procedure (i.e., RACH resource), a preamble format, etc.

In the case where multiple SS blocks are included in a SS burst set, upon receiving an SS block, the user apparatus 200 starts the random access procedure by transmitting a preamble via a RACH resource that is associated with the obtained SS block (S3).

When the random access procedure between the base station apparatus 100 and the user apparatus 200 is successful in step S3, the initial access is completed and a normal communication is started (S4).

Figure 3:
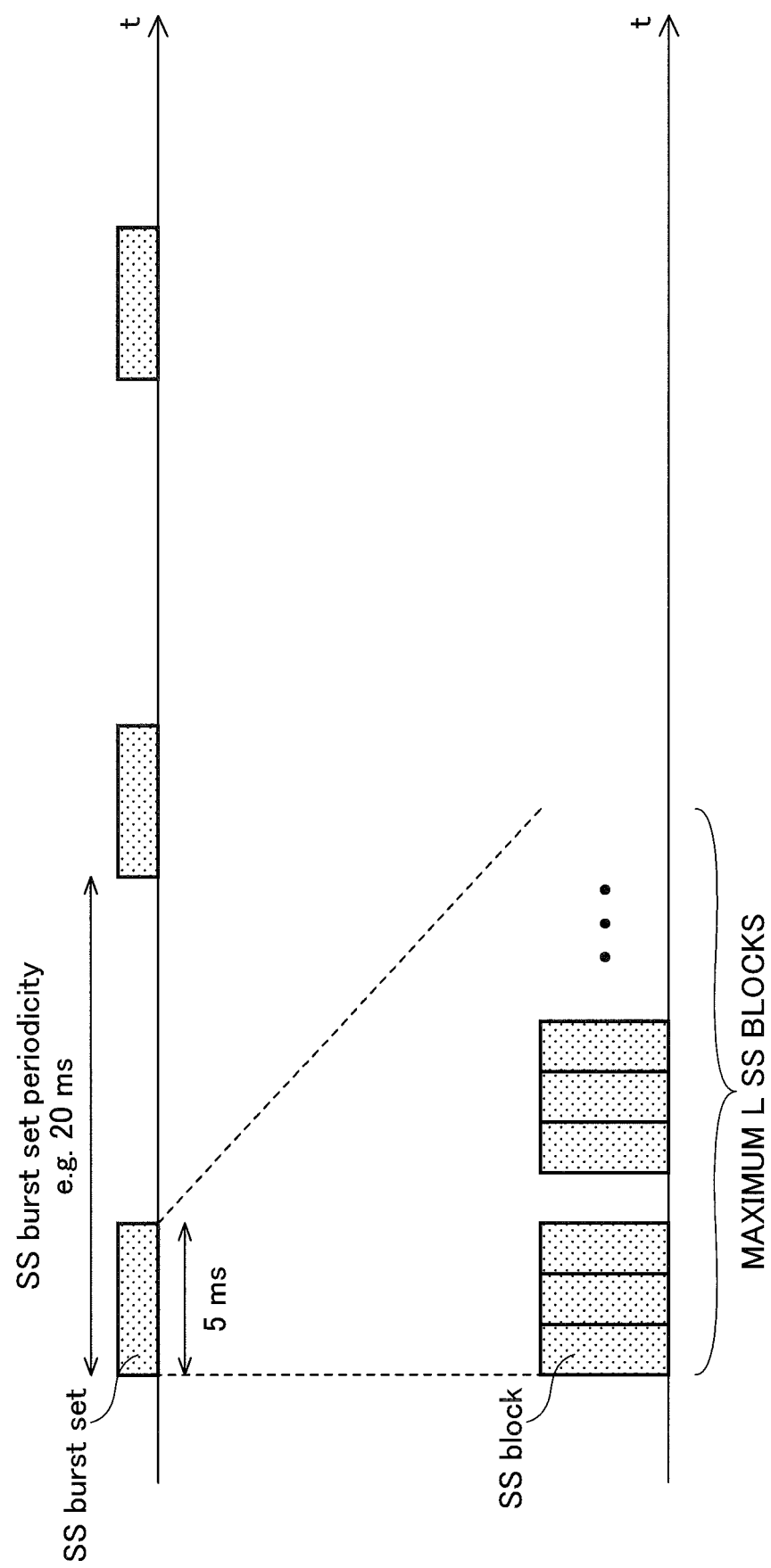
FIG. 3 is a drawing illustrating an SS burst set according to an embodiment of the present invention.

FIG. 3 is a drawing illustrating an SS burst set according to an embodiment of the present invention. As illustrated in FIG. 3, the SS burst set includes as many as one to L SS blocks. Resource candidates used for transmitting the SS blocks are included in a 5 ms period. It is not necessary for the SS block to be arranged in all of the L candidate positions in the SS burst set. The number of the SS blocks transmitted from the base station apparatus 100 and arranged in the L candidate positions is equal to or less than L according to the actual operation. The resource at a candidate position, at which the SS block is not arranged, is used for normal communications. In other words, L indicates the maximum number of the SS blocks in a SS burst set. Further, L may be a different value according to the frequency band. For example, L=4 in a frequency band equal to or less than 3 GHz, L=8 in a frequency band between 3 GHz and 6 GHz, and L=64 in a frequency band between 6 GHz and 52.6 GHz.

Further, in an example illustrated in FIG. 3, "SS burst set periodicity", that indicates a cycle at which SS burst sets are transmitted, is 20 ms. The minimum value of the "SS burst set periodicity" may be 5 ms.

Figure 4:
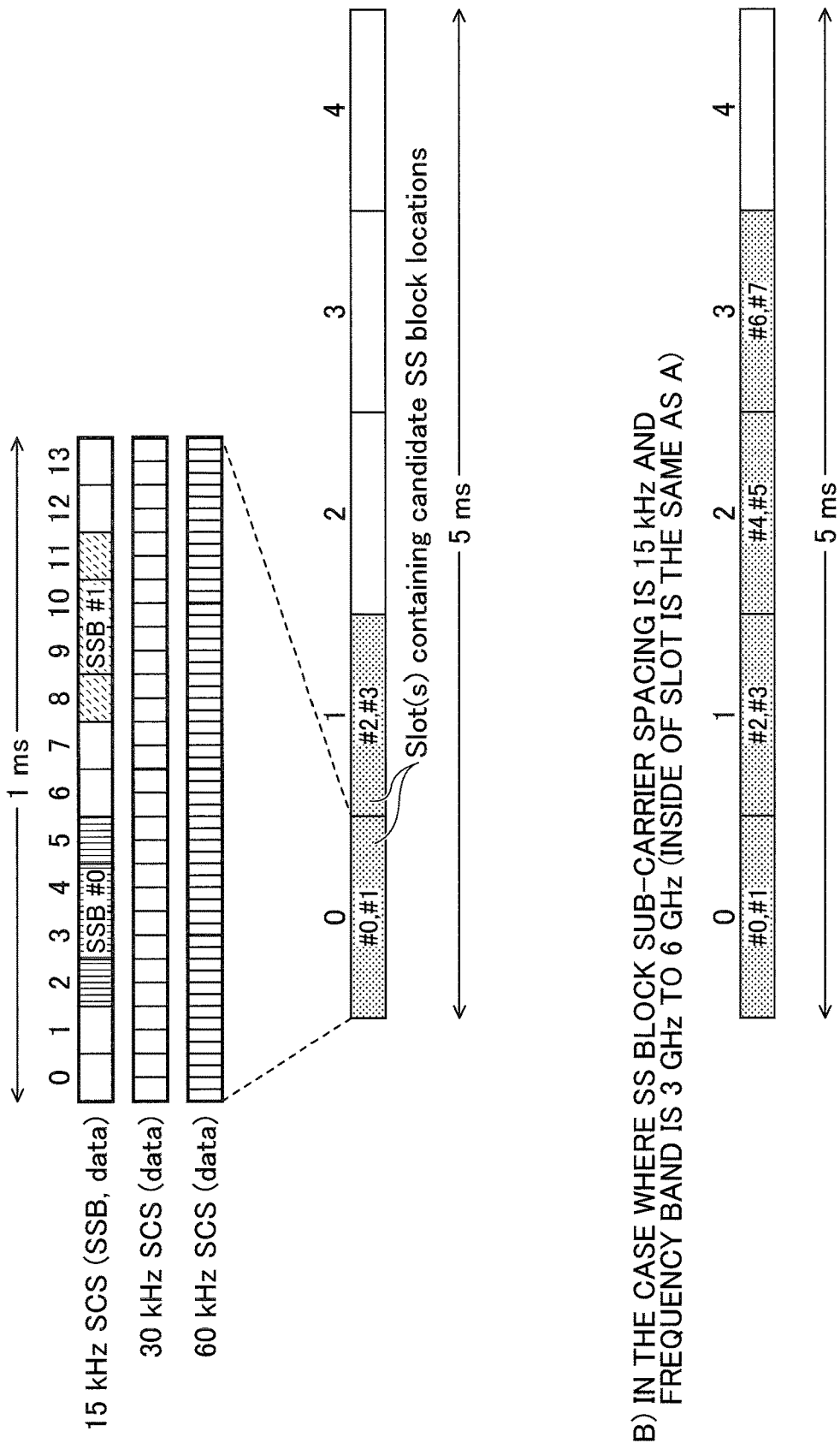
FIG. 4 is a drawing illustrating a configuration example (1) of an SS burst set according to an embodiment of the present invention.

FIG. 4 is a drawing illustrating a configuration example (1) of an SS burst set according to an embodiment of the present invention. In FIG. 4, an example is shown in which the SS burst set is arranged in a time unit of 5 ms or 1 ms in the radio frame.

FIG. 4A is a configuration example of an SS burst set in the case where the sub-carrier spacing of radio signals via which SS blocks are transmitted is 15 kHz and where the frequency band is up to 3 GHz. First two slots, of the five slots corresponding to 5 ms, include SS blocks (hereinafter, also referred to as "SSB"). An SSB #0 and an SSB #1 are arranged in a slot #0, and an SSB #2 and an SSB #3 are arranged in a slot #1. A slot with 1 ms includes 14 symbols from a symbol #0 to a symbol #13. As illustrated in FIG. 4A, the SSB #0 is arranged in the radio frame with 15 kHz SCS (sub-carrier spacing) from a symbol #2 to a symbol #4, and the SSB #1 is arranged in the radio frame from a symbol #8 to a symbol #11. The radio frame with 15 kHz SCS is used for transmitting and receiving an SSB and data, and the radio frame with 30 kHz SCS and 60 kHz SCS is used for transmitting and receiving data.

FIG. 4B is a configuration example of an SS burst set in the case where the sub-carrier spacing of radio signals via which SS blocks are transmitted is 15 kHz and where the frequency band is between 3 GHz and 6 GHz. First four slots, of the five slots corresponding to 5 ms, include SS blocks. The SSB #0 and the SSB #1 are arranged in the slot #0, the SSB #2 and the SSB #3 are arranged in the slot #1, the SSB #4 and the SSB #5 are arranged in the slot #2, and the SSB #6 and the SSB #7 are arranged in the slot #3. The arrangement of the SS blocks in the symbols in a slot may be the same as FIG. 4A.

FIG. 5 is a drawing illustrating a configuration example (2) of an SS burst set according to an embodiment of the present invention. In FIG. 5, an example is shown in which the SS burst set is arranged in a time unit of 5 ms or 1 ms in the radio frame.

FIG. 5A is a configuration example of an SS burst set in the case where the sub-carrier spacing of radio signals via which SS blocks are transmitted is 30 kHz. The SSB #0 is arranged in a slot from a symbol #4 to a symbol #7, and the SSB #1 is arranged from a symbol #8 to a symbol #11. The SSB #2 is arranged in the subsequent slot from a symbol #2 to a symbol #5, and the SSB #3 is arranged from a symbol #6 to a symbol #9. The SSB #0 through the SSB #3 are arranged in two consecutive slots. The radio frame with 30 kHz SCS is used for transmitting and receiving an SSB and data, and the radio frame with 15 kHz SCS and 60 kHz SCS is used for transmitting and receiving data.

FIG. 5B is another configuration example of an SS burst set in the case where the sub-carrier spacing of radio signals via which SS blocks are transmitted is 30 kHz. The SSB #0 is arranged in a slot from a symbol #2 to a symbol #5, and the SSB #1 is arranged from a symbol #8 to a symbol #11. The SSB #2 is arranged in the subsequent slot from a symbol #2 to a symbol #5, and the SSB #3 is arranged from a symbol #8 to a symbol #11. The SSB #0 through the SSB #3 are arranged in two consecutive slots. The radio frame with 30 kHz SCS is used for transmitting and receiving an SSB and data, and the radio frame with 15 kHz SCS and 60 kHz SCS is used for transmitting and receiving data.

An example of an SS burst set in the case where the frequency band of radio signals used for transmitting SS blocks is between 0 Hz and 3 GHz is illustrated by slot units in 5 ms in FIG. 5C. It is assumed that the slots are referred to as slot #0 to slot #9 in the time order. As illustrated in FIG. 5C, an SSB #0 and an SSB #1 are arranged in the slot #0, and an SSB #2 and an SSB #3 are arranged in the slot #1.

FIG. 5D illustrates an example of an SS burst set using 5 ms as the slot unit in the case where the frequency band of radio signals used for transmitting SS blocks is between 3 GHz and 6 GHz. It is assumed that the slots are referred to as slot #0 to slot #9 in the time order. As illustrated in FIG. 5D, SSB #0 and SSB #1 are arranged in slot #0, SSB #2 and SSB #3 are arranged in slot #1, SSB #4 and SSB #5 are arranged in slot #2, and SSB #5 and SSB #7 are arranged in slot #3.

FIG. 6 is a drawing illustrating a configuration example (3) of an SS burst set according to an embodiment of the present invention. In FIG. 6, an example is shown in which the SS burst set is arranged in a time unit of 5 ms or 0.25 ms in the radio frame.

FIG. 6A is a configuration example of an SS burst set in the case where the sub-carrier spacing of radio signals via which SS blocks are transmitted is 120 kHz and where the frequency band is between 6 GHz and 52.6 GHz. It is assumed that the slots in the figure illustrated by slot units in 5 ms are slot #0 to slot #39 in the time order. SSB #32 is arranged in slot #20 from symbol #4 to symbol #7, and SSB #33 is arranged from symbol #8 to symbol #11. SSB #34 is arranged in slot #22 from symbol #2 to symbol #5, and SSB #35 is arranged from symbol #6 to symbol #9. With the same configuration in slot, SSBs from #0 to #15 are arranged in slots from #0 to #7, SSBs from #16 to #31 are arranged in slots #10 to #17, SSBs from #32 to #47 are arranged in slots from #20 to #27, and SSBs from #48 to #63 are arranged in slots from #30 to #37. The radio frame with 120 kHz SCS may be used for transmitting and receiving SSBs and data, and the radio frame with 60 kHz SCS may be used for transmitting and receiving data.

FIG. 6B is a configuration example of an SS burst set in the case where the sub-carrier spacing of radio signals via which SS blocks are transmitted is 240 kHz and where the frequency band is between 6 GHz and 52.6 GHz. It is assumed that the slots in the figure illustrated by slot units in 5 ms are slot #0 to slot #79 in the time order. In the drawing of FIG. 6B, one square corresponds to two slots. SSB #56 is arranged in slot #32 from symbol #8 to symbol #11, SSB #57 is arranged in slots #32 and #33 from slot #32 symbol #12 to slot #33 symbol #1, SSB #58 is arranged in slot #33 from symbol #2 to symbol #5, and SSB #59 #59 is arranged in slot #33 from symbol #6 to symbol #9. SSB #60 is arranged in slot #34 from symbol #4 to symbol #7, SSB #61 is arranged in slot #34 from symbol #8 to symbol #11, SSB #62 is arranged in slots #34 and #35 from slot #34 symbol #12 to slot #35 symbol #1, and SSB #63 is arranged in slot #35 from symbol #2 to symbol #5. According to the same slot configuration, SSBs #0-#31 are arranged in slots #0-#15, and SSBs #32-#63 are arranged in slots #20-#35. The radio frame with 240 kHz SCS may be used for transmitting and receiving SSBs, and the radio frame with 60 kHz SCS and 120 kHz SCS may be used for transmitting and receiving data.

Figure 7:
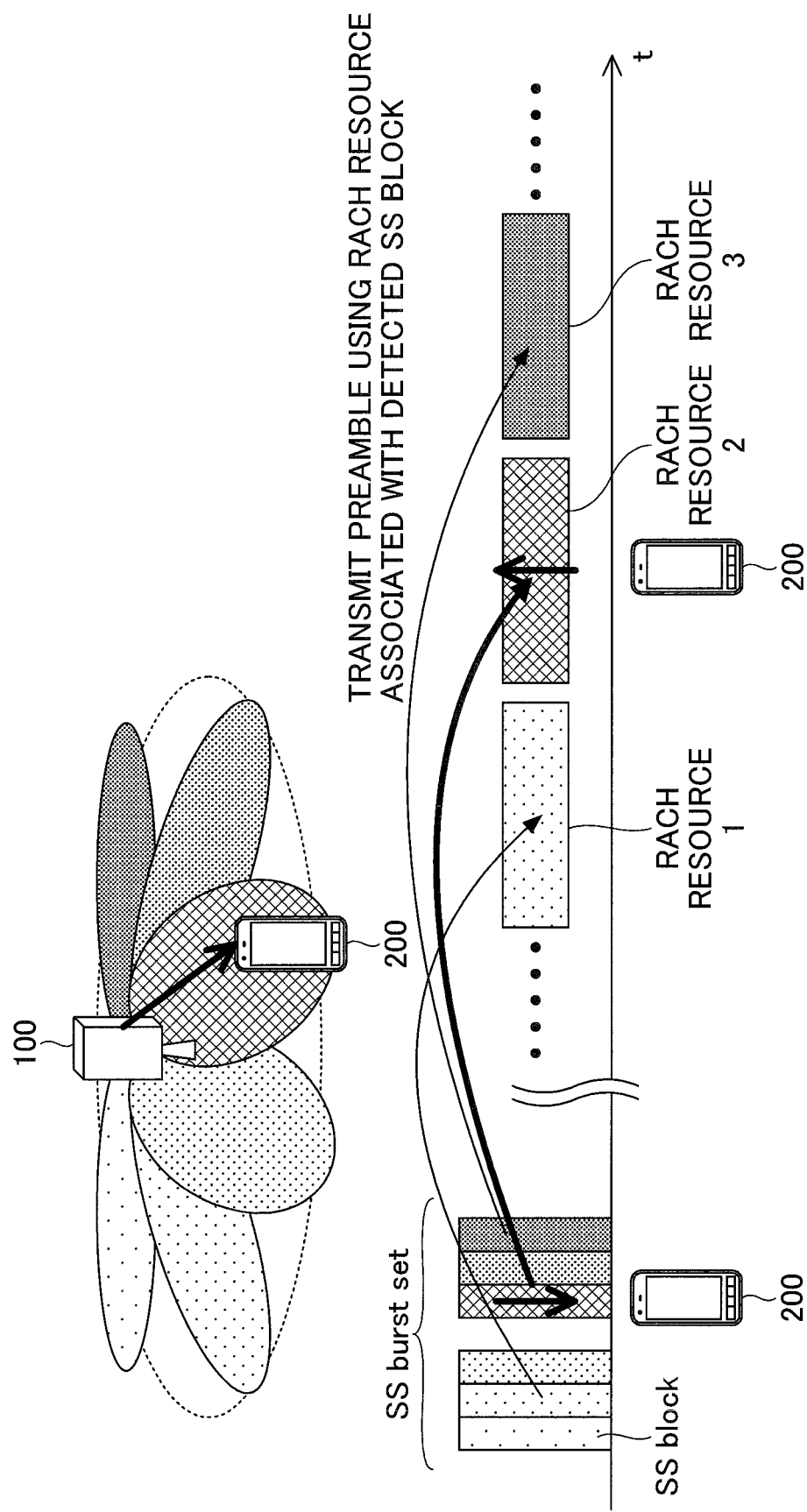
FIG. 7 is a drawing illustrating a RACH resource that is associated with an SS block according to an embodiment of the present invention.

FIG. 7 is a drawing illustrating a RACH resource that is associated with an SS block according to an embodiment of the present invention. As illustrated in FIG. 7, in NR, an SS burst set including the SS blocks associated with beams is transmitted from the base station apparatus 100. The user apparatus 200 receives a detectable SS block, and starts an initial access procedure by transmitting a preamble via a RACH resource that is associated with the received SS block. The RACH resource may be associated with a beam.

In an example illustrated in FIG. 7, the user apparatus 200 receives the fourth SS block included in the SS burst set, and transmits a preamble via a RACH resource 2 that is associated with the fourth SS block. Further, in the example illustrated in FIG. 4, the second SS block included in the SS burst set is associated with a RACH resource 1, and the sixth SS block included in the SS burst set is associated with a RACH resource 3. Further, there is an SS block index corresponding to a SS block. For example, the SS block index of the fourth SS block included in the SS burst set is defined as "4".

In other words, as illustrated in FIG. 7, the SS blocks may be associated with the RACH resources or preamble indexes. Further, for example, a single SS block may be associated with a plurality of RACH resources or preamble indexes. Further, each of the SS blocks may be associated with a plurality of RACH resources in the time direction, a plurality of RACH resources in the frequency direction, or a range of a plurality of preamble indexes.

In NR, similar to LTE, an RACH configuration table is defined. A table specifying index is indicated from a base station apparatus 100 to a user apparatus 200, and thus, positions of available RACH resources in the time domain, the number of RACH resources, the density of the RACH resources, etc., are indicated. Associations (correspondences) between each of the indicated available RACH resources and the SS blocks may be indicated from the base station apparatus 100 to the user apparatus 200, or may be predefined.

FIG. 8 is an example (1) of a slot format in an embodiment of the present invention. In a slot format in NR, FIG. 8 illustrates an example in which continuous two slots include a downlink slot and an uplink slot. It should be noted that there are five formats, "0", "1", "2", "3", "4" defined in an example illustrated in FIG. 8. In each of the formats, uses of symbols included in the slot are defined. The symbol type in a downlink slot is any one of a "Downlink" that is used for downlink, an "Unknown" that is not defined in terms of whether used for downlink or uplink, and a "NOT downlink" that is not used for downlink. The symbol type in an uplink slot is any one of a "Not uplink" that is not used for uplink, an "Unknown" that is not defined in terms of whether used for uplink or downlink, and an "uplink" that is used for uplink. It should be noted that one slot includes 14 symbols. In the following, an n-th symbol in a slot is described as a symbol #n.

In format "0", symbols #0-#13 are used as "Unknown" in the downlink slot, and symbols #0-#13 are used as "Unknown" in the uplink slot. In format "1", symbols #0-#13 are used as "Downlink" in the downlink slot, and symbols #0-#13 are used as "Uplink" in the uplink slot. In format "2", symbols #0-#13 are used as "Downlink" in the downlink slot, and there is no definition with respect to the uplink slot. In format "3", there is no definition with respect to the downlink slot, and symbols #0-#13 are used as "Downlink" in the uplink slot. In format "4", a symbol #0 is used as "Downlink", symbols #1-#12 are used as "Unknown", a symbol #13 is used as "Not downlink" with respect to the downlink slot, and, a symbol #0 is used as "Not uplink", symbols #1-#12 are used as "Unknown", and a symbol #13 is used as "Uplink" with respect to the uplink slot. The formats illustrated in FIG. 8 are examples. Use of each symbol may be defined freely.

Figure 9:
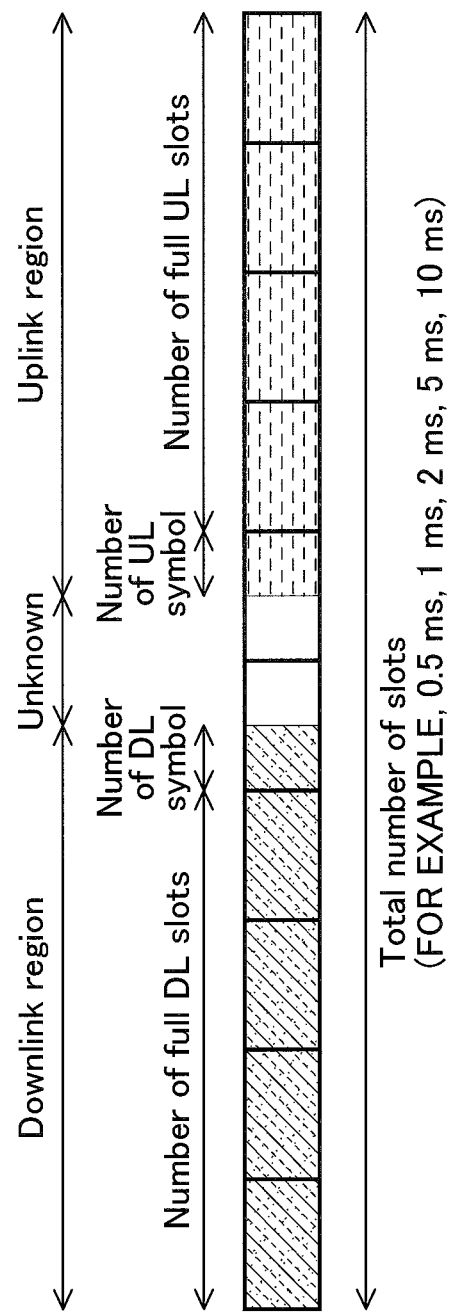
FIG. 9 is an example (2) of a slot format in an embodiment of the present invention.

FIG. 9 is an example (2) of a slot format in an embodiment of the present invention. FIG. 9 illustrates a DL/UL assignment with a format in which slots or symbols are used as DL, UL, or Unknown in a 10-slots period.

In order to indicate the format illustrated in FIG. 9, the following parameters may be indicated from the base station apparatus 100 to the user apparatus 200:
1) Total number of slots
2) Number of full DL slots in which all symbols are arranged as DL symbols
3) Number of DL symbols indicating the number of DL symbols in a certain slot (fifth slot in FIG. 9)
4) Number of UL symbols indicating the number of UL symbols in a certain slot (sixth slot in FIG. 9)
5) Number of full UL slots in which all symbols are arranged as UL symbols It should be noted that, with respect to the above-described parameters, it is not necessary that all of the parameters are indicated, and some of the parameters may be predefined.

In FIG. 9, different from the format illustrated in FIG. 8: the number of slots in which only DL symbols are arranged; the number of DL symbols in a slot in which some DL symbols are arranged; the number of UL symbols in a slot in which some UL symbols are arranged; and the number of slots in which only UL symbols are arranged, may be indicated to the user apparatus 200. Further, a total number of slots which indicates a cycle at which a format is repeated (10 slots in FIG. 9) may be indicated to the user apparatus 200, or may be predefined. The total number of slots may be indicated by a period of time, and, as illustrated in FIG. 9, the total number of slots may be indicated, to the user apparatus 200, as 0.5 ms, 1 ms, 2 ms, 5 ms, 10 ms, etc., or may be predefined. It should be noted that positions, whose use as DL or UL is not specified, are "unknown". In the format illustrated in FIG. 9, full DL slots in which all symbols are arranged as DL symbols; slots that include "unknown"; and full UL slots in which all symbols are arranged as UL symbols, are arranged in this order in the time domain.

Here, in NR, the number L is defined which indicates the number of transmission candidate positions of SS blocks in the time domain illustrated in FIG. 3. With respect to the above, the number of SS blocks that are actually transmitted may be freely determined to be a number equal to or less than L. Therefore, it is difficult to define a time-domain related RACH configuration table that can be adapted to all of SS block arrangement patterns, or to define positions of RACH resources in the time domain that can be adapted to all of SS block arrangement patterns.

Further, compared with the TDD configuration in LTE, more flexible DL/UL assignment is available in NR as illustrated in FIG. 8. It can be assumed that a format is used which defines a DL/UL assignment for a long period that exceeds two slots. Therefore, it is difficult to define a time-domain related RACH configuration table that can be adapted to all of the DL/UL patterns.

Further, in the case where the format as illustrated in FIG. 9 is used, it can be assumed that "UL" exists only in a slot in the second half of the total number of slots in the format. Therefore, when determining the RACH resource arrangement in the time domain, it becomes necessary to take into account the total number of slots in the format.

Figure 10:
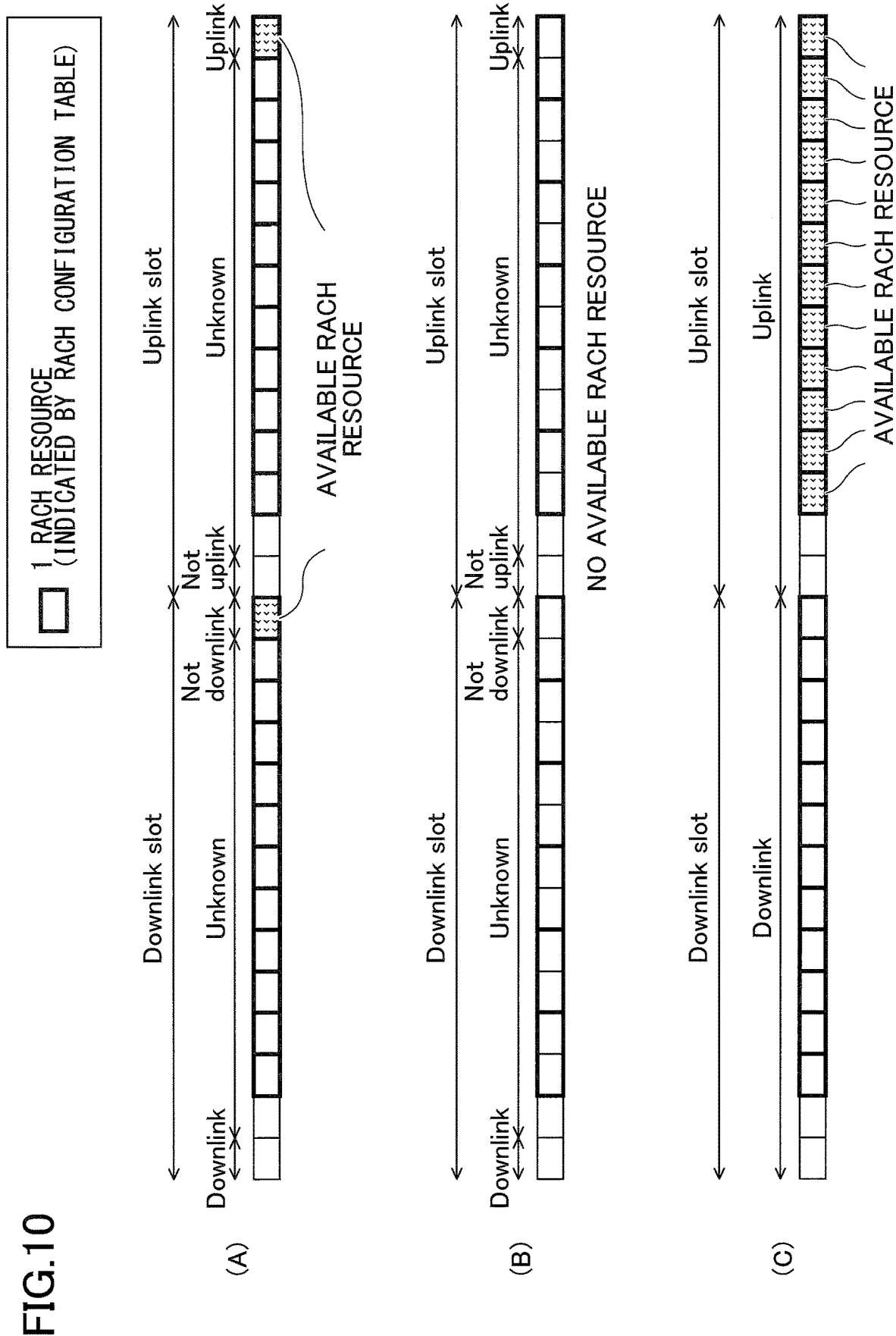
FIG. 10 is an example (1) of RACH resources in an embodiment of the present invention.

FIG. 10 is an arrangement example (1) of RACH resources in an embodiment of the present invention. FIG. 10 illustrates an example in which available RACH resources are arranged in the downlink slot and the uplink slot according to the RACH configuration table in NR. A thin-lined frame indicates a symbol, and a bold-lined frame indicates a RACH resource.

Of all the RACH resources allocated at positions in the time domain based on the RACH configuration table that has been indicated to the user apparatus 200 via broadcast information, etc., or based on an index specifying the table, RACH resources that are arranged in resources (symbols) other than the resources (symbols) corresponding to "UL" may be excluded from the available RACH resources, the table being based on the DL/UL assignment that has been indicated to the user apparatus 200 via broadcast information, etc. In other words, of all the RACH resources allocated at positions in the time domain based on the RACH configuration table or based on the index that specifies the table, it is possible for the user apparatus 200 to use the RACH resources other than the excluded RACH resources. With respect to the RACH resources other than the excluded RACH resources, associations with the SS blocks may be defined. Further, the excluded RACH resources may be used for scheduling for data channels or control channels by the base station apparatus 100.

FIG. 10A illustrates available RACH resources based on a case where the time length of a PRACH preamble format is one symbol and where the slot format is "Format 4" as illustrated in FIG. 8. In "Format 4", in the downlink slot, a symbol #0 is "Downlink", symbols #1 to #12 are "Unknown", and a symbol #13 is "Not downlink". Further, in the uplink slot, a symbol #0 is "Not uplink", symbols #1 to #12 are "Unknown", and a symbol #13 is "Uplink". RACH resources that are overlapped by symbols of "Downlink" and "Unknown" in the downlink slot are excluded, and RACH resources that are overlapped by symbols of "Not downlink symbol" are available. Further, RACH resources that are overlapped by symbols of "Not uplink symbol" and "Unknown" in the uplink slot are excluded, and RACH resources that are overlapped by symbols of "Uplink" are available. Therefore, as illustrated in FIG. 10A, a symbol #13 in the downlink slot and a symbol #13 in the uplink slot are available resources.

FIG. 10B illustrates available RACH resources based on a case where the time length of a PRACH preamble format is two symbols and where the slot format is "Format 4" as illustrated in FIG. 8. In "Format 4", in the downlink slot, a symbol #0 is "Downlink", symbols #1 to #12 are "Unknown", and a symbol #13 is "Not downlink". Further, in the uplink slot, a symbol #0 is "Not uplink", symbols #1 to #12 are "Unknown", and a symbol #13 is "Uplink". RACH resources that are overlapped by symbols of "Downlink" and "Unknown" in the downlink slot are excluded, and RACH resources that are overlapped by symbols of "Not downlink symbol" are available. Further, RACH resources that are overlapped by symbols of "Not uplink symbol" and "Unknown" in the uplink slot are excluded, and RACH resources that are overlapped by symbols of "Uplink" are available. Therefore, as illustrated in FIG. 10B, a symbol #13 in the downlink slot and a symbol #13 in the uplink slot are supposed to be available resources. However, because the time length of a PRACH preamble format is two symbols, there is no available resource.

FIG. 10C illustrates available RACH resources based on a case where the time length of a PRACH preamble format is one symbol and where the slot format is "Format 1" as illustrated in FIG. 8. In "Format 1", in the downlink slot, symbols #0-#13 are used as "Downlink", and, in the uplink slot, symbols #0-#13 are used as "Uplink". RACH resources that are overlapped by symbols of "Downlink" in the downlink slot are excluded. Further, RACH resources that are overlapped by symbols of "Uplink" in the uplink slot are available resources. Therefore, as illustrated in FIG. 10C, a symbol #13 in the downlink slot and a symbol #13 in the uplink slot are supposed to be available resources.

Further, as another example, RACH resources that are overlapped by symbols of "Downlink" and "Unknown" in the downlink slot may be excluded, and RACH resources that are overlapped by symbols of "Not downlink symbol" may be available. Further, as yet another example, RACH resources that are overlapped by symbols of "Not uplink symbol" in the uplink slot may be excluded, and RACH resources that are overlapped by symbols of "Unknown" and "Uplink" may be available.

Figure 11:
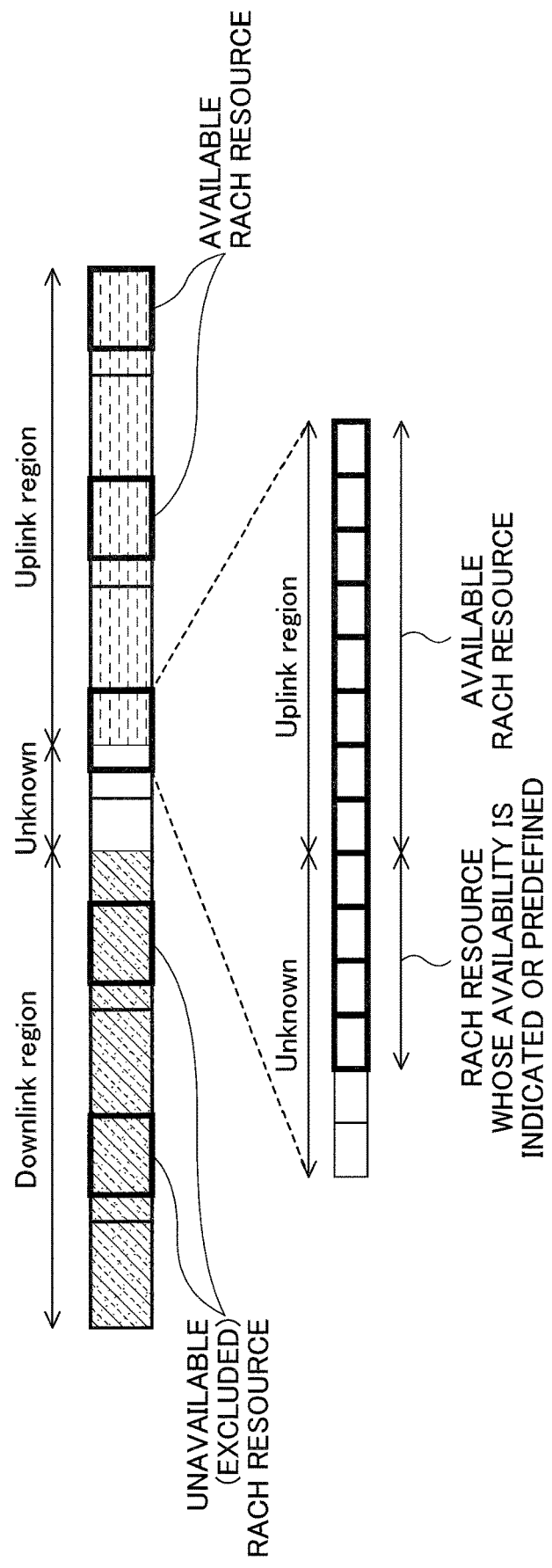
FIG. 11 is an example (2) of RACH resources in an embodiment of the present invention.

FIG. 11 is a drawing illustrating an example (2) of RACH resources in an embodiment of the present invention.

Referring to FIG. 11, an example will be described in which available RACH resources are arranged in the slot with a format illustrated in FIG. 9 according to the RACH configuration table in NR. A thin-lined frame indicates a symbol, and a bold-lined frame indicates a RACH resource candidate. It should be noted that FIG. 11 illustrates available RACH resources in a slot in a case where the time length of a PRACH preamble format is one symbol.

As illustrated in FIG. 11, RACH resources that are allocated to "Downlink region" are excluded. With respect to the above, RACH resources that are allocated to "Uplink region" are available resources. In the slots in which "Unknown" and "Uplink region" are included as illustrated in FIG. 11, availability of the RACH resources is determined per symbol unit. RACH resources that are allocated to symbols included in the "Uplink region" are available resources. With respect to the above, availability of RACH resources that are allocated to symbols included in the "Unknown" may be indicated or may be predefined.

In other words, in the case where a DL/UL assignment with a format as illustrated in FIG. 11 is applied, RACH resources that are included in a range explicitly allocated as the DL slot or the DL symbol are excluded from available RACH resources. Further, RACH resources that are overlapped by an Unknown range that are not explicitly allocated as the DL slot, DL symbol, the UL slot, or the UL symbol are not excluded from available RACH resources.

Further, as another example, in the case where a DL/UL assignment with a format as illustrated in FIG. 11 is applied, RACH resources that are included in a range explicitly allocated as the DL slot or the DL symbol are excluded from available RACH resources. Further, RACH resources that are overlapped by an Unknown range that are not explicitly allocated as the DL slot, DL symbol, the UL slot, or the UL symbol may be used as available RACH resources.

Further, as yet another example, in the case where a DL/UL assignment with a format illustrated in FIG. 11 and where the total number of slots is indicated from the base station apparatus 100 to the user apparatus 200 or is predefined, RACH resources in the time domain specified as an index of the RACH configuration table may be implicitly or explicitly indicated to the user apparatus 200 based on the time length of the total number of slots.

With respect to a unit of indication of the time domain in the RACH configuration table, the time domain may be indicated by a symbol unit, by a slot unit, by a sub-frame unit or 1 ms unit, or by an SFN unit or 10 ms unit.

In the case where information indicating the time domain in the RACH configuration table is indicated by using a long time unit: RACH resources may be arranged in all of units that are shorter than the long time unit; an arrangement of RACH resources related to a portion with the shorter time length unit may be further indicated by the RACH configuration table or may be predefined. For example, in the case where the time length is indicated by a sub-frame unit, an arrangement may be further indicated in which symbols #3 to #13 in even-numbered slots are arranged as the RACH resources, based on the RACH configuration table.

Further, as another example, a DL/UL assignment with a format illustrated in FIG. 11 may be applied, and the arrangement density of the RACH resources per total number of slots may be indicated based on the RACH configuration table. For example, an index of the RACH configuration table may be defined with respect to a period in which the total number of slots is repeated for four times. Further, for example, an index of the RACH configuration table may be defined with respect to a period in which the total number of slots is repeated once. In other words, an absolute value of an actual repeat period is determined according to the total number of slots.

Further, as another example, an index of the RACH configuration table may be defined for each assumed total number of slots. For example, by assuming a total number of slots in 1 ms, a 1-ms period RACH resource arrangement as a high density arrangement, a 4-ms period RACH resource arrangement as a low density arrangement, etc., may be defined for each index of the RACH configuration table.

Further, for each index of the RACH configuration table that is indicated from the base station apparatus 100, the index may be used only for the case in which the total number of slots is the same number of slots that is assumed. Further, the index may be used even in the case where a different total number of slots is indicated from the base station apparatus 100. For example, in the case where a 4-ms period RACH resource arrangement is specified by an index of the RACH configuration table by assuming a total number of slots in 1 ms, a high density RACH resource arrangement may be performed by using the same index by assuming a total number of slots in 4 ms.

Further, as another example, the RACH configuration table may be defined in such a way that RACH resources are arranged at a period of a multiple of 10 ms as an available maximum value of the total number of slots.

Figure 12:
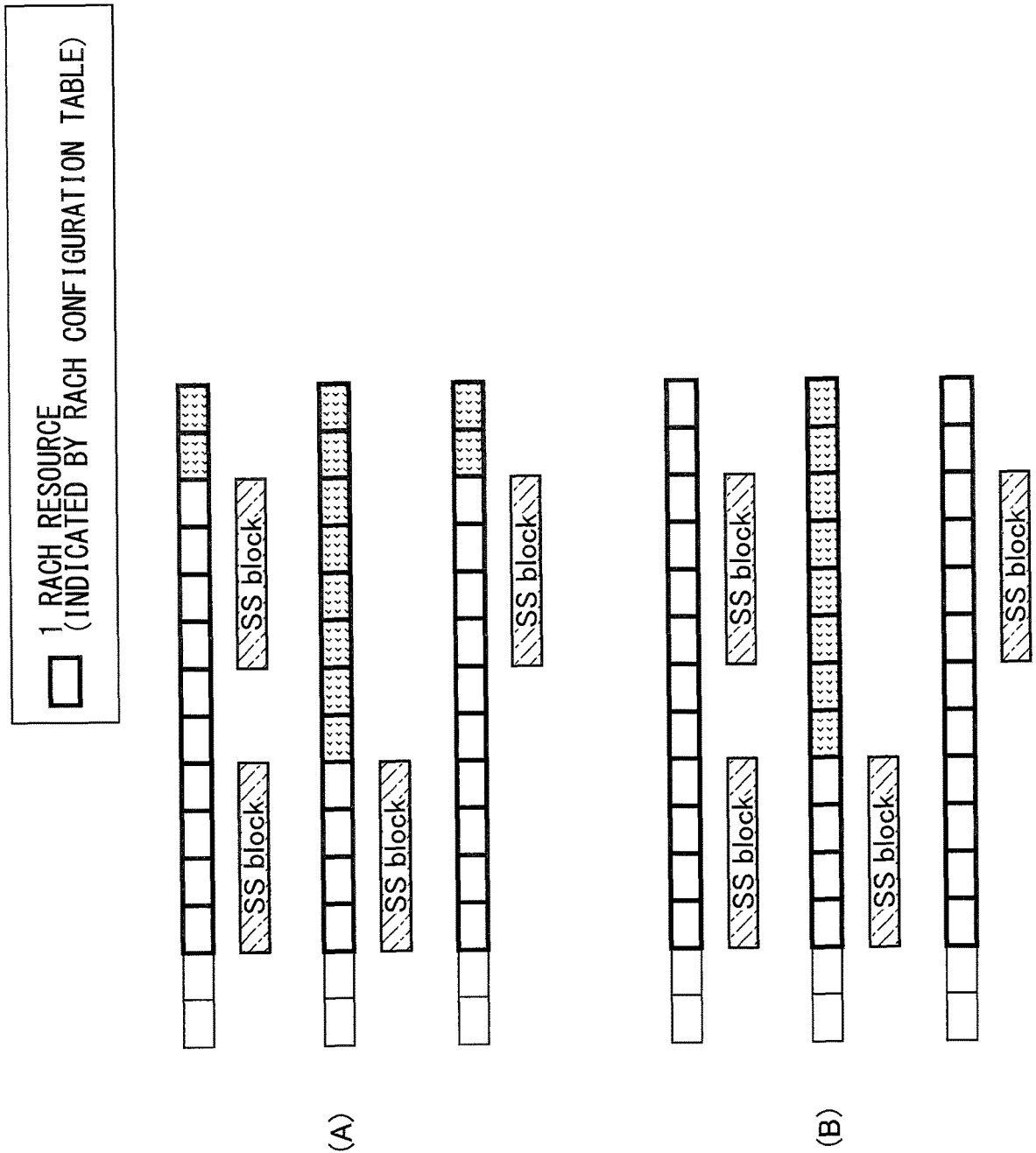
FIG. 12 is an example (3) of RACH resources in an embodiment of the present invention.

FIG. 12 is a drawing illustrating an example (3) of RACH resources in an embodiment of the present invention.

FIG. 12 illustrates an example in which available RACH resources according to the RACH configuration table in NR are arranged in slots in which SS blocks are included in the time domain. A thin-lined frame indicates a symbol, and a bold-lined frame indicates a RACH resource.

Of all time domain positions of RACH resources allocated based on the RACH configuration table indicated to the user apparatus 200 via broadcast information, etc., or based on an index that specifies the table, RACH resources arranged in slots that are overlapped by actually-transmitted SS blocks may be excluded from RACH resources in the slots, a part or all of the RACH resources being available RACH resources. The above-described exclusion of RACH resources based on the time domain positions of the actually-transmitted SS blocks may be applied only in the case where the duplex method is TDD. With respect to the RACH resources other than the excluded RACH resources, associations with the SS blocks may be defined. Further, the excluded RACH resources may be used for scheduling for data channels or control channels by the base station apparatus 100.

FIG. 12A illustrates available RACH resources in a slot in a case where the time length of a PRACH preamble format is one symbol. In the slot that is overlapped by SS blocks, RACH resources that are positioned after the last actually-transmitted SS block in the time domain may be specified as available RACH resources. In other words, in a first slot illustrated in FIG. 12A, symbols #12 and #13 are available RACH resources because SS blocks are arranged from symbol #2 to symbol #5, and from symbol #8 to symbol #11. Further, in a second slot illustrated in FIG. 12A, symbols #6 through #13 are available RACH resources because an SS block is arranged from symbol #2 to symbol #5. Further, in a third slot illustrated in FIG. 12A, symbols #12 and #13 are available RACH resources because an SS block is arranged from symbol #8 to symbol #11.

Further, as another example, FIG. 12B illustrates available RACH resources in a slot in the case where the time length of the PRACH preamble format is one symbol. It is an example in which there are two actually-transmitted SS blocks in a slot that is overlapped by SS blocks. In the case where, of all the transmission candidate positions of the two SS blocks, only a first SS block in the time domain is actually transmitted, RACH resources that exist at symbols that are positioned after the symbols that include the first SS block are available RACH resources. In the case where, of all the two SS blocks, only a last SS block in the time domain is actually transmitted or the two SS blocks are actually transmitted, all RACH resources in the slots are excluded from available RACH resources. In other words, in a first slot illustrated in FIG. 12B, because the two SS blocks are transmitted, there is no available RACH resource in the slot. In a second slot illustrated in FIG. 12B, because the first SS block of the two SS blocks in the time domain is transmitted, symbols #6 through #13 are available RACH resources. In a third slot illustrated in FIG. 12B, because the second SS block of the two SS block transmission candidate positions in the time domain is transmitted, there is no available RACH resource in the slot.

Further, as another example, by further dividing the slot into the first half slot including first seven symbols and the second half slot including second seven symbols, RACH resources that exist in one or two of the half slots in which SS blocks are transmitted may be excluded from the available RACH resources.

Further, as another example, independently from the DL/UL assignment or time domain positions of the SS blocks, the base station apparatus 100 may indicate, to the user apparatus 200, information indicating time domain positions of RACH resources according to the RACH configuration table.

For example, the base station apparatus 100 may indicate, to the user apparatus 200, information indicating that the RACH resources of available RACH resources are arranged in the k-th slot or n-th symbol. The available RACH resources may be specified by: the symbols used as "Not downlink" and "uplink"; or the symbols arranged after the SS blocks in the time domain within the slot.

Further, as another example, the RACH configuration table may be defined for each of the PRACH sub-carrier spacings. The reason for having the RACH configuration table defined for each of the PRACH sub-carrier spacings is as follows. Even if the same preamble format is used, the preamble time lengths may be different according to the PRACH sub-carrier spacings and, as a result, if a common RACH configuration table is used, it becomes difficult to set appropriate time domain positions of the RACH resources using an index that specifies the table by taking into account the DL/UL assignment or positions of SS blocks.

For example, in the case where the sequence length of PRACH is a long sequence (i.e., 839) and where 1.25 kHz or 5 kHz is applied as the PRACH sub-carrier spacing, an RACH configuration table may be specified for the long sequence.

On the other hand, in the case where the sequence length of PRACH is a short sequence (i.e., 139) and where 15 kHz or 30 kHz is applied as the PRACH sub-carrier spacing when the frequency band is equal to or less than 6 GHz, and 60 kHz or 120 kHz is applied as the PRACH sub-carrier spacing when the frequency band is equal to or greater than 6 GHz, four RACH configuration tables may be specified for the short sequence corresponding to different PRACH sub-carrier spacings.

It should be noted that the RACH configuration table for the long sequence may be specified based on the 1 ms slot length. Further, the RACH configuration table may be specified based on each of the slot lengths corresponding to 15 kHz/30 kHz/60 kHz/120 kHz (i.e., 1 ms/0.5 ms/0.25 ms/0.125 ms).

In the above-described embodiment, the user apparatus 200 is enabled to use RACH resources other than the excluded RACH resources of the RACH resources allocated based on the index of the RACH configuration table indicated by the base station apparatus 100, the excluded RACH resources being excluded based on the DL/UL assignment or the SS block arrangement. Further, the RACH configuration table may be specified for each of the PRACH sub-carrier spacings.

In other words, it is possible to efficiently indicate available resources to the user apparatus in the initial access of a wireless communication system.

(Apparatus Structure)

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 13:
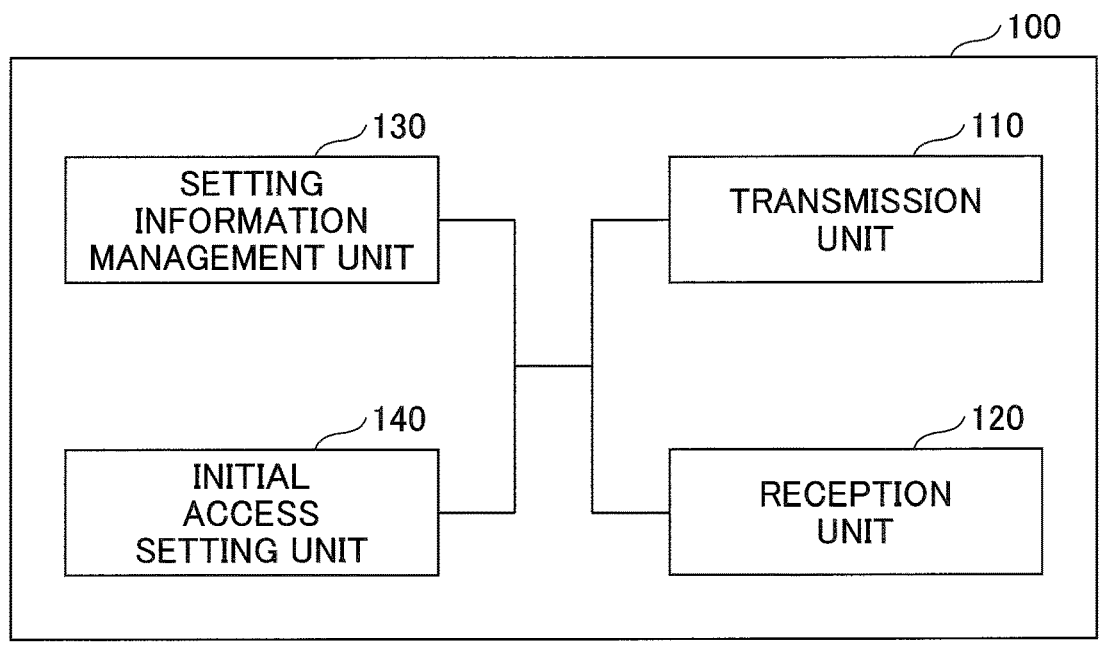
FIG. 13 is a drawing illustrating an example of a functional structure of a base station apparatus 100 according to an embodiment of the present invention.

FIG. 13 is a drawing illustrating an example of a functional structure of a base station apparatus 100. As illustrated in FIG. 13, the base station apparatus 100 includes a transmission unit 110, a reception unit 120, a setting information management unit 130, and an initial access setting unit 140. The functional structure illustrated in FIG. 13 is merely an example. Functional divisions and names of functional units may be anything as long as it can perform operations according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting to the user apparatus 200 NR-PSS, NR-SSS, NR-PBCH, DL/UL control signals, etc. Further, the transmission unit 110 transmits to the user apparatus 200 information related to transmission power control and information related to scheduling, and the reception unit 120 receives from the user apparatus 200 a message related to a preamble and initial access.

The setting information management unit 130 stores preset setting information and various setting information items to be transmitted to the user apparatus 200. Contents of the setting information are, for example, information to be used for initial access, etc.

The initial access setting unit 140 controls transmission of a synchronization signal from the base station apparatus 100 to the user apparatus 200 and transmission of information used for initial access. The initial access setting unit 140 also controls initial access from the user apparatus 200.

Figure 14:
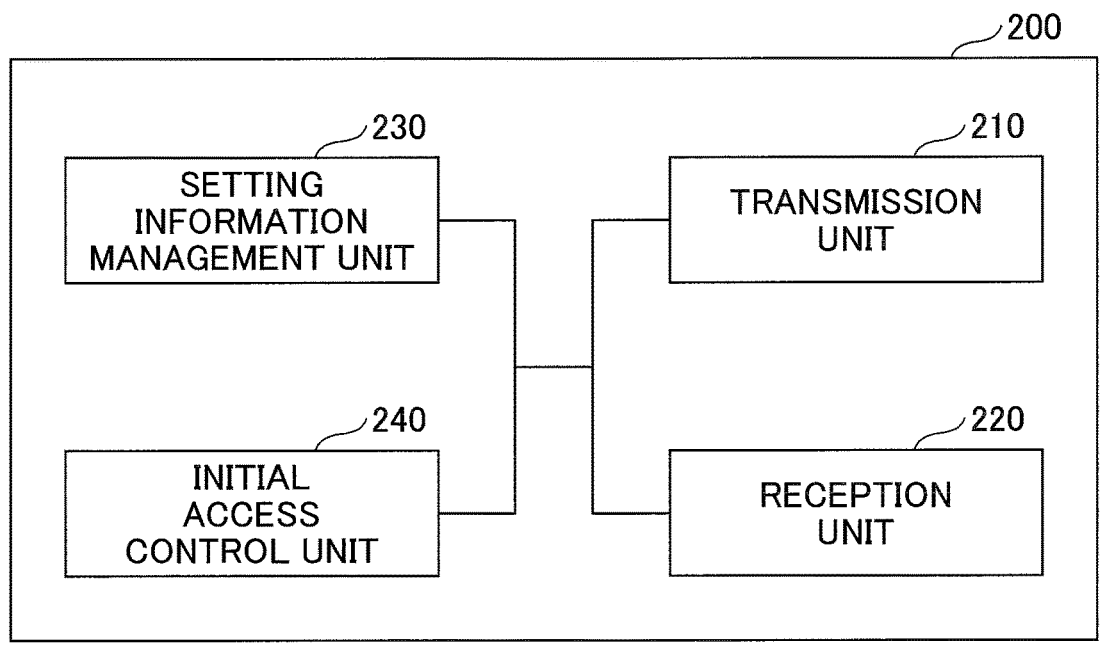
FIG. 14 is a drawing illustrating an example of a functional structure of a user apparatus 200 according to an embodiment of the present invention.

FIG. 14 is a drawing illustrating an example of a functional structure of a user apparatus 200. As illustrated in FIG. 14, the user apparatus 200 includes a transmission unit 210, a reception unit 220, a setting information management unit 230, and an initial access control unit 240. The functional structure illustrated in FIG. 14 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, the transmission unit 210 transmits to the base station apparatus 100 a message related to a preamble and initial access, and the reception unit 220 receives from the base station apparatus 100 information to be used for initial access.

The setting information management unit 230 stores various setting information items received by the reception unit 220 from the base station apparatus 100. Further, the setting information management unit 230 also stores preset setting information. Contents of the setting information are, for example, information to be used for initial access, etc.

The initial access control unit 240 controls initial access of the user apparatus 200 described in an embodiment of the present invention. It should be noted that the functional units related to preamble signal transmission, etc., in the initial access control unit 240 may be included in the transmission unit 210, and the functional units related to system information reception, etc., in the initial access control unit 240 may be included in the reception unit 220.

(Hardware Structure)

In the above functional structure diagrams used for describing an embodiment of the present invention (FIG. 13 and FIG. 14), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 15:
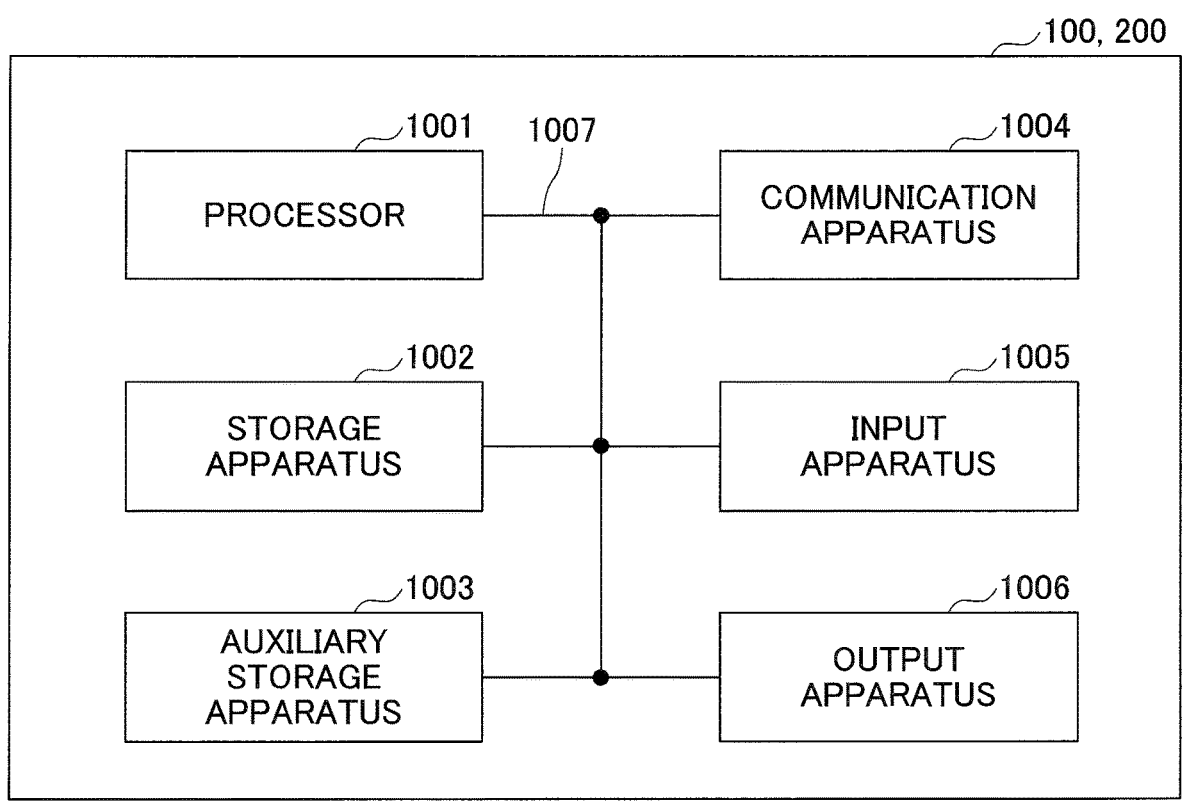
FIG. 15 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 15 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the initial access setting unit 140 of the base station apparatus 100 illustrated in FIG. 13 may be realized by control programs that are stored in the storage apparatus 1002 and are executed by the processor 1001. Further, for example, the transmission unit 210, the reception unit 220, the setting information management unit 230, and the initial access control unit 240 of the user apparatus 200 illustrated in FIG. 14 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a user apparatus that communicates with a base station apparatus via a radio frame is provided. The user apparatus includes a reception unit configured to receive information related to a RACH configuration table that indicates allocation of RACH resources in the time domain in the radio frame and information that excludes RACH resources of the radio frame that are unavailable in the time domain, a control unit configured to identify available RACH resources based on the information related to the RACH configuration table and the information that excludes RACH resources that are unavailable, and a transmission unit configured to transmit a preamble to the base station apparatus by using the identified available RACH resources.

With the above-described arrangement, it is possible for the base station apparatus to cause the user apparatus to identify RACH resources by indicating allocation of RACH resources using the RACH configuration table and information that excludes unavailable RACH resources. Therefore, it is possible to efficiently indicate available resources to the user apparatus in the initial access of a wireless communication system.

The information used for excluding unavailable RACH resources of the radio frame in the time domain may be information indicating a downlink arrangement or an uplink arrangement. With the above-described arrangement, it is possible for the user apparatus to identify available RACH resources based on the DL/UL assignment.

The information indicating a downlink arrangement or an uplink arrangement is information indicating time domain positions of: symbols that are used for downlink and symbols that are not defined to be used for downlink or uplink, included in a downlink slot; and symbols that are not used for uplink and symbols that are not defined to be used for uplink or downlink, included in a uplink slot. With the above-described arrangement, it is possible for the user apparatus to identify available RACH resources based on types of symbols in the DL/UL assignment.

The control unit may identify available RACH resources by: excluding RACH resources that are positioned in the time domain before a symbol in which the last SS block in a slot is included, based on the information used for excluding unavailable RACH resources of the radio frame in the time domain and time domain positions of received SS blocks; excluding, in the case where there are two SS block transmission candidate positions in a slot and where only a first SS block in the time domain is received, RACH resources that are positioned before a symbol in which the first SS block is included; or excluding, in the case where there are two SS blocks transmission candidate positions in a slot and where a second SS block in the time domain is received or the two SS blocks are received, all of RACH resources in the slot. With the above-described arrangement, it is possible for the user apparatus to identify available RACH resources based on the SS block arrangement.

The RACH configuration table may be defined for each of sub-carrier spacings of channels used for transmitting preambles. With the above-described arrangement, by setting (configuring) different RACH configuration tables for PRACH with different sub-carrier spacings, it is possible for the user apparatus to use RACH resources that are positioned appropriately in the time domain according to the sub-carrier spacings or that have preamble time lengths according to the sub-carrier spacings.

Further, as described above, according to an embodiment of the present invention, a base station apparatus that communicates with a user apparatus via a radio frame is provided. The base station apparatus includes a transmission unit configured to transmit information related to a RACH configuration table that indicates allocation of RACH resources in the time domain in the radio frame and information used for excluding RACH resources of the radio frame that are unavailable in the time domain, a setting unit configured to set available RACH resources based on the information related to the RACH configuration table and the information used for excluding RACH resources that are unavailable, and a reception unit configured to receive a preamble from the user apparatus by using the identified available RACH resources.

With the above-described arrangement, it is possible for the base station apparatus to cause the user apparatus to identify RACH resources by indicating allocation of RACH resources using the RACH configuration table and information used for excluding unavailable RACH resources. Therefore, it is possible to efficiently indicate available resources to the user apparatus in the initial access of a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Aspects and embodiments described in the present specification may be applied to a system in which LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems are used, or may be applied to a next generation system enhanced based on the above systems.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the arte, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that the SS blocks are examples of the SS blocks in an embodiment of the present invention. The initial access setting unit 140 is an example of a setting unit. RMSI is an example of information, that is not included in the blocks, required for initial access. The initial access control unit 240 is an example of a control unit. The RACH configuration table is an example of a RACH configuration table. The DL/UL assignment is an example of information indicating a downlink arrangement and an uplink arrangement. "Downlink slot" in FIG. 8 or "Downlink region" in FIG. 9 is an example of a downlink slot. "Uplink region" in FIG. 9 is an example of an uplink slot or symbols used for uplink. "Downlink" in FIG. 8 and a DL slot or a DL symbol in FIG. 9 are examples of symbols used for downlink. "Unknown" in FIG. 8 or FIG. 9 is an example of a symbol for which it is not defined whether it is used for downlink or uplink. "Not uplink" in FIG. 8 is an example of a symbol that is not used for uplink.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

DESCRIPTION OF THE REFERENCE NUMERALS

100 Base station apparatus
200 User apparatus
110 Transmission unit
120 Reception unit 130 Setting information management unit
140 Initial access setting unit
200 User apparatus
210 Transmission unit
220 Reception unit
230 Setting information management unit
240 Initial access control unit
1001 Processor
1002 Storage apparatus
1003 Auxiliary storage apparatus
1004 Communication apparatus
1005 Input apparatus
1006 Output apparatus

What is claimed is:

1. A terminal comprising:
a receiver that receives information related to a Random Access Channel (RACH) configuration indicating an allocation of RACH resources in a time domain and information indicating a downlink arrangement or an uplink arrangement;
a processor that identifies available RACH resources based on the RACH resources indicated by the information related to the RACH configuration and the information indicating the downlink arrangement or the uplink arrangement; and
a transmitter that transmits a preamble by using the available RACH resources,
wherein the processor identifies, as an available RACH resource from among the RACH resources indicated by the information related to the RACH configuration, a RACH resource located after a SS (Synchronization signal) block in the time domain.

2. The terminal according to claim 1, wherein the processor identifies a RACH resource indicated by the information related to the RACH configuration as available in a case that the RACH resource is located on an uplink arrangement indicated by the information indicating the downlink arrangement or the uplink arrangement.

3. The terminal according to claim 1, wherein the processor excludes a RACH resource indicated by the information related to the RACH configuration from available RACH resources in a case that the RACH resource is located on a downlink arrangement indicated by the information indicating the downlink arrangement or the uplink arrangement.

4. The terminal according to claim 1, wherein the processor excludes a RACH resource indicated by the information related to the RACH configuration from available RACH resources in a case that the RACH resource is overlapped with a SS (Synchronization signal) block in the time domain.

5. The terminal according to claim 1, wherein it is configured which slot in a sub-frame is arranged as a RACH resource in a case that a unit of indication in the information related to the RACH configuration is a sub-frame.

6. The terminal according to claim 1, wherein information indicating that RACH resources are arranged at a period of a multiple of 10 ms is indicated by the information related to the RACH configuration.

7. A base station apparatus comprising:
a transmitter that transmits information related to a Random Access Channel (RACH) configuration indicating an allocation of RACH resources in a time domain and information indicating a downlink arrangement or an uplink arrangement;
a processor that identifies available RACH resources based on RACH resources indicated by the information related to the RACH configuration and the information indicating the downlink arrangement or the uplink arrangement; and
a receiver that receives a preamble by using the available RACH resources,
wherein the processor identifies, as an available RACH resource from among the RACH resources indicated by the information related to the RACH configuration, a RACH resource located after a SS (Synchronization signal) block in the time domain.

* * * * *